United States Patent [19]
Stephenson et al.

[11] Patent Number: 5,134,673
[45] Date of Patent: Jul. 28, 1992

[54] OPTICAL FIBER ARRAY SPLICING DEVICE

[75] Inventors: Daniel L. Stephenson, Norcross; Kenneth M. Yasinski, Ellenwood, both of Ga.

[73] Assignee: AT&T Bell Laboratories, Murray Hill, N.J.

[21] Appl. No.: 698,513

[22] Filed: May 10, 1991

[51] Int. Cl.⁵ .............................................. G02B 6/38
[52] U.S. Cl. ........................................ 385/56; 385/54; 385/136
[58] Field of Search ................ 350/96.2, 96.21, 96.22; 385/54, 63, 65, 56, 58, 59, 136, 137

[56] References Cited

U.S. PATENT DOCUMENTS

| | | | |
|---|---|---|---|
| 3,864,018 | 2/1975 | Miller | 385/98 |
| 4,649,670 | 3/1987 | Snyder | 51/284 R |
| 4,662,713 | 5/1987 | Davies et al. | 350/96.2 |
| 4,762,387 | 8/1988 | Batdorf et al. | 350/96.2 |

FOREIGN PATENT DOCUMENTS 56-60409  5/1981  Japan ................. 350/96.21

WO85/02025  5/1985  PCT Int'l Appl. ............. 350/96.22

Primary Examiner—John D. Lee
Assistant Examiner—John Ngo
Attorney, Agent, or Firm—Edward W. Somers

[57] ABSTRACT

Terminated arrays (22,22) of optical fibers are spliced together by a splicing device (20) which includes a housing (40). The housing includes two sidewalls (42,42) and two endwalls (46,46), each endwall adapted to have an end portion of a terminated array inserted therethrough. The end portions of the terminated arrays are received between two negative chips (33,33) disposed between two backing plates (60,60) to cause the terminated arrays to be aligned. Clamping means (70) includes two spring clips (72,72) each adapted to be disposed in an armed position to allow insertion of the end portions of the terminated arrays and then to be moved to a clamping position in which portions of the clips are in compressive engagement with the backing plates to hold the terminated arrays in alignment and in the housing.

19 Claims, 5 Drawing Sheets

OPTICAL FIBER ARRAY SPLICING DEVICE

TECHNICAL FIELD

This invention relates to an optical fiber array splicing device. More particularly, the invention relates to a splicing device in which terminated end portions of two optical fiber ribbons to be spliced are clamped in fixed positions in an array organizer.

BACKGROUND OF THE INVENTION

Optical fibers now are widely used and are capable of competing favorably with other communication transmission media. This capability requires that economical splicing techniques be available for optical fiber systems. The linking of two fibers requires precise axial alignment and end separation. As one can imagine, the splicing of two optical fibers each having a core diameter in the range of about 8 to 50 microns is not an easy task. Splicing becomes even more of a problem for a plurality of optical fibers of an array such as, for example, a fiber ribbon which may comprise twelve individual fibers. The problem in splicing an array of optical fibers is to be able to position a first end of one array adjacent to a similar end of another array so that corresponding optical fibers all are in precise axial alignment and to hold the arrays in such position.

An arrangement for splicing arrays of optical fibers is shown in U.S. Pat. No. 3,864,018, which issued on Feb. 4, 1975 in the name of C. M. Miller. An array of optical fibers is terminated in a duplicatable manner by a terminator in the form of substrates, which are called chips and which have spaced, parallel optical fiber-receiving grooves and ridges on top and bottom surfaces. Fibers of an array are held in aligned, opposing grooves of two chips, which are referred to as positive chips and which presently are made of a silicon material. The assembly of positive chips and fibers, which may be referred to as a terminated array, is potted to maintain the precision geometry of the array. A splice includes a butt joint of two such terminated arrays which are aligned with respect to each other by so-called negative chips which span over the butted positive chips on each side of the terminated arrays. The negative chips each have a plurality of grooves and ridges which are aligned with the ridges and the grooves of the positive chips to maintain the geometry. Clips are installed about the assembly to secure together the chips.

Problems have surfaced during the installation and use of the hereinbefore-identified splicing array connector. Considering the sizes of the elements of the array splice, assembly is somewhat difficult. The manipulation of such small components requires a high level of dexterity. Also, the arrangement is such that portions of the splice connector are exposed to contaminants.

What is sought after and what seemingly is not available in the prior art is an optical fiber array splicing device which is relatively easy to assemble and which prevents substantially the exposure of portions of the splicing arrangement to contaminants. Of course, such a sought after splicing device should be capable of being attractively priced. Further, the overall size of the sought after splicing device should be minimized to allow its use in existing or future environments which are restricted in space.

SUMMARY OF THE INVENTION

The foregoing problems of the prior art have been overcome by the optical fiber array splicing device of this invention. An optical fiber array splicing device for splicing together terminated arrays of optical fibers comprises a housing which includes two sidewalls and two endwalls, each endwall having an opening therein for receiving a terminated array of optical fibers and each sidewall including inwardly facing support means. Also included are alignment means mounted in engagement with the support means and held within the housing to provide a cavity therebetween for receiving a terminated array of fibers at each end of the housing. The terminated arrays upon insertion into the housing become disposed between and engage the alignment means to cause fiber end portions of the arrays to become aligned. Clamping facilities are adapted to be assembled to the housing in an armed, first position and, after the terminated arrays have been inserted into the housing, are capable of being moved to a clamping, second position whereat portions of the clamping facilities are in compressive engagement with the alignment means to secure the terminated arrays within the housing.

Each terminated array includes a plurality of optical fiber end portions which are disposed in a planar array. Each optical fiber end portion is received in aligned grooves of two juxtaposed positive chips with each chip also including a plurality of longitudinally extending grooves on an outwardly facing surface thereof. In the splicing device, the terminated arrays when inserted into the housing are butted together between two negative chips each of which on one surface thereof includes a plurality of longitudinally extending ridges and grooves. Each negative chip spans across the two butted terminated arrays with the ridges of the negative chips received in grooves on the outwardly facing surfaces of the positive chips and with ridges on the outwardly facing surfaces of the positive chips being received in grooves of the negative chips to align the terminated arrays.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
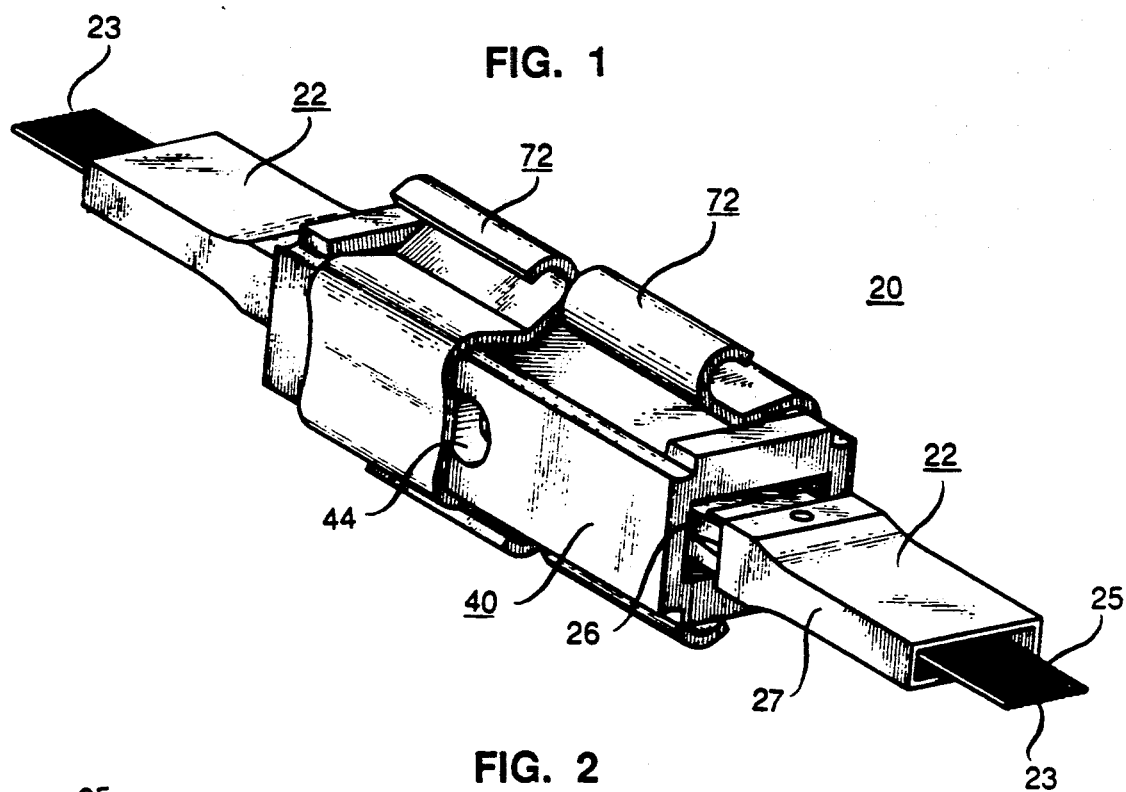
FIG. 1 is a perspective view of an optical fiber array splicing arrangement which includes an optical fiber array splicing device of this invention with two end portions of two terminated arrays being spliced thereby.

Referring now to FIG. 1, there is shown an optical fiber array splice device which is designated generally by the numeral 20. The device 20 is adapted to splice together end portions of two optical fiber terminated arrays 22—22 (see also FIG. 2). Each terminated array 22 includes at least one optical fiber 23.

Figure 2:
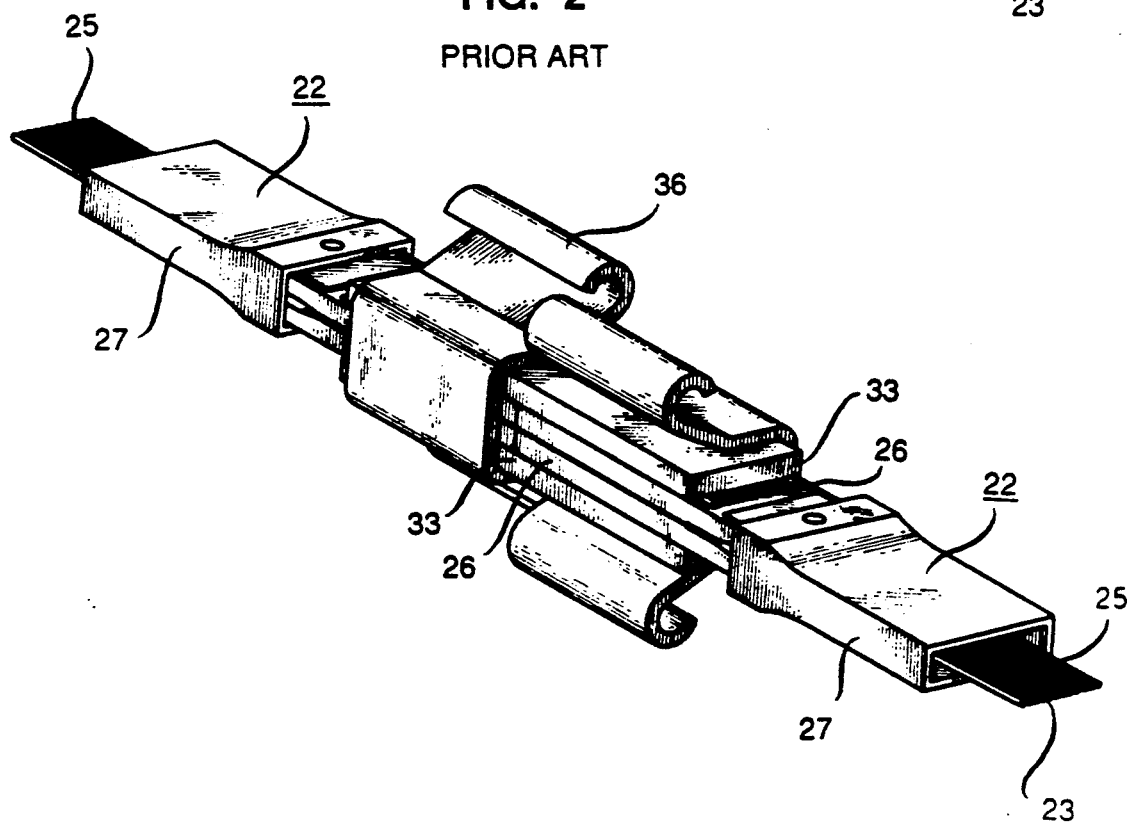
FIG. 2 is a perspective view of a prior art splicing arrangement.
Figure 3:
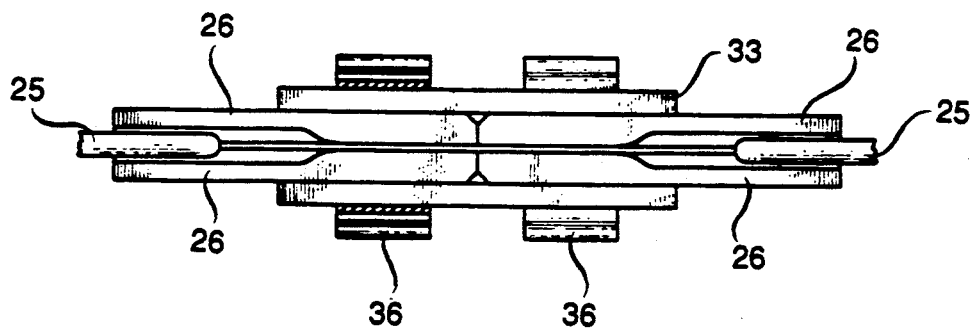
FIG. 3 is a front elevational view of the prior art splicing arrangement of FIG. 2.
Figure 4:
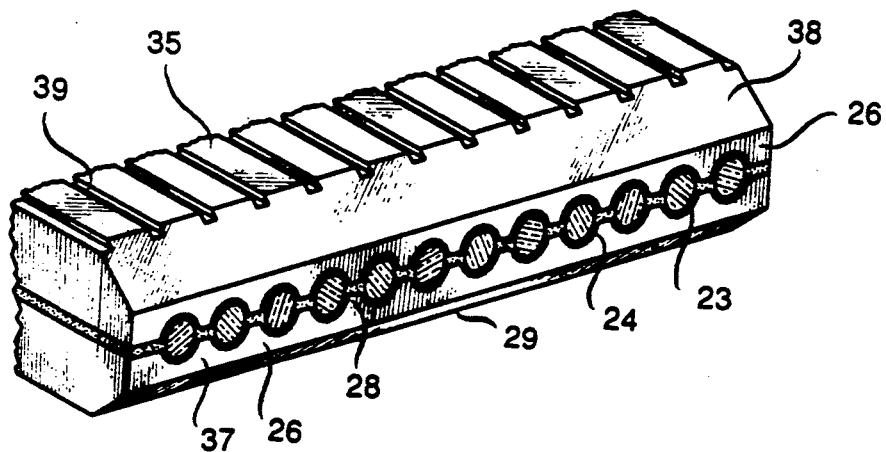
FIG. 4 is a perspective view of an end portion of a terminated array of optical fibers which includes two positive chips and optical fiber end portions held therebetween.

As can be seen in FIGS. 1, 2 and 3, the assembly 22 typically includes a plurality of lightguide fibers 23—23 of a ribbon 25. The fibers 23—23 are held between portions of a terminator in the form of a pair of silicon substrates 26—26 (see also FIG. 4). The silicon substrates are referred to as chips and, more particularly, those designated 26—26 are referred to as positive chips. Each of the optical fibers 23—23 is received in a channel formed by opposing grooves 24—24 (see FIG. 4) between longitudinally extending ridges 28—28 between the two opposed silicon chips 26—26. Strain relief portions 27—27 (see FIGS. 1 and 3) are attached to positive chips 26—26 to reduce stress to fibers 23—23 from bending of fibers. For an apparatus which is used to prepare the assembly of optical fiber ribbons and positive silicon chips, see D. Q. Snyder U.S. Pat. No. 4,379,771 which issued on Apr. 12, 1983 and which is incorporated by reference hereinto. After that assembly, an epoxy potting material is used to encapsulate the end portions of the optical fibers at one end 29 of the terminated array 22.

Figure 5:
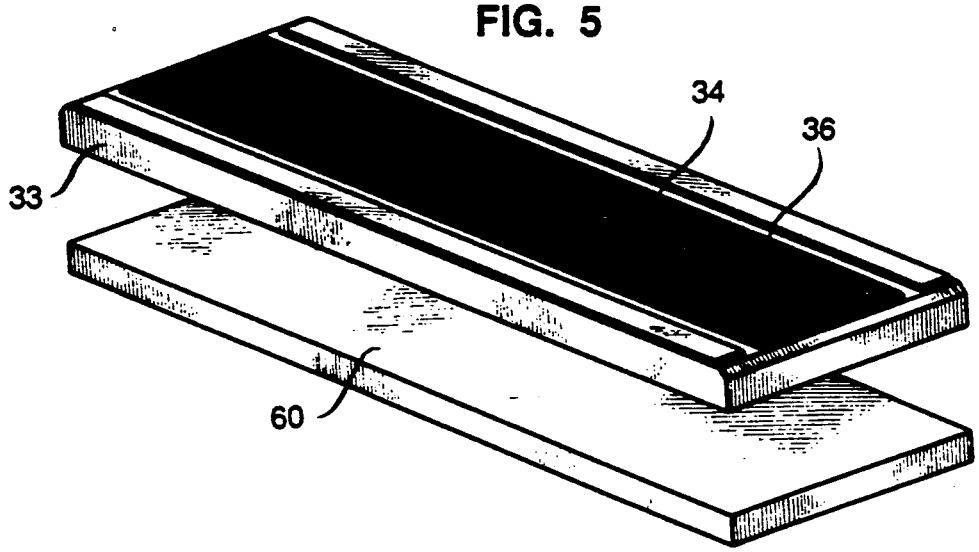
FIG. 5 is a perspective view of a negative chip and a backing plate.

After the optical fibers 23—23 and positive silicon chips 26—26 have been assembled together by the above-mentioned D. Q. Snyder methods and apparatus, a portion of each of the optical fibers extends beyond the chips. Those portions of the fibers 23—23 which extend beyond the end of the terminated array 22 that is destined to abut the end of another such assembly must be cut off. This is necessary inasmuch as the assembly 22 will be interconnected or spliced with another assembly of positive silicon chips 26—26 and optical fibers 23—23 between two negative silicon chips 33—33 (see FIGS. 2, 3 and 5) having grooves 34—34 and ridges 36—36 which mate with ridges 35—35 and grooves 39—39, respectively, on outwardly facing surfaces of the positive chips. In a prior art splice assembly, the negative chips 33—33 are held in engagement with the positive chips 26—26 by clips 36—36 (see FIGS. 2 and 3) which engage backing plates (not shown) superimposed on the negative chips.

It is important to the splice that the ends of the two terminated arrays 22—22 including the positive silicon chips 26—26 have end surfaces 37—37 (see FIG. 4) which are substantially normal to the longitudinal axis of the array of optical fibers 23—23. Also, an optical grade finish is required for the ends of the optical fibers 23—23 which terminate in the surface 37. Also, it is important that the ends of each of the terminated arrays 22—22 have beveled portions 38—38 which terminate in the surface 37 comprising end surfaces of the chips 26—26 and fibers 23—23 and the potting material. This is done in order to facilitate the assembly of the positive and negative chips 26—26 and 33—33, respectively, and to prevent damaging of the ends of the substrates during a splicing operation.

Figure 6:
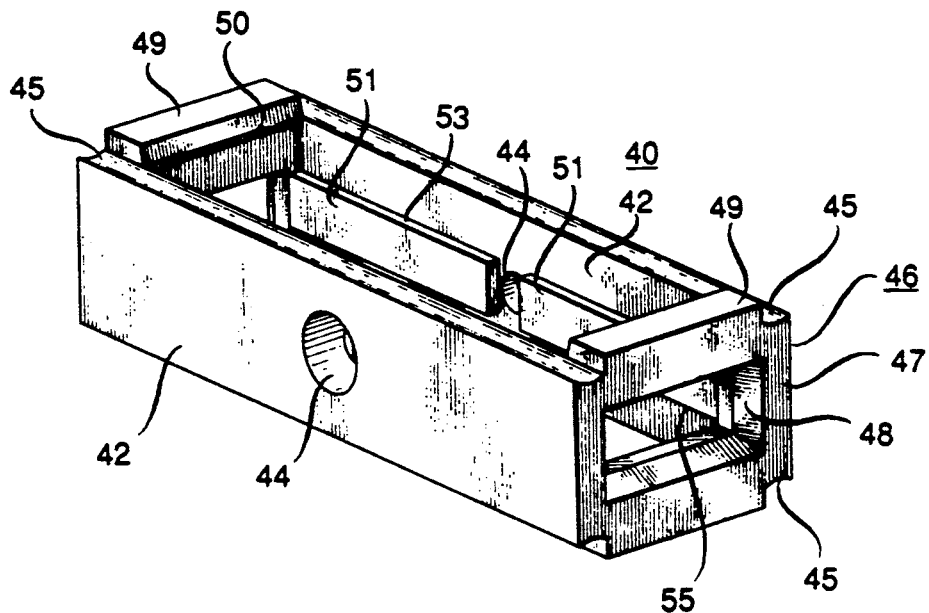
FIG. 6 is a perspective view of a housing of the splicing device of FIG. 1.

Referring now to FIG. 6, there is shown a coupler housing designated generally by the numeral 40. The housing 40 is made of a plastic material such as polycarbonate, for example, and includes two sidewalls 42—42 each of which is provided with an access opening 44 to facilitate the introduction of an index matching material into the vicinity of the splice. Also, longitudinal edge surfaces 45—45 of each sidewall have a concave configuration.

The coupler housing 40 also includes two endwalls 46—46. As can be seen in FIG. 6 each endwall includes two side portions 47—47. Also, as can be seen in FIG. 6, each endwall includes an entry 48 which is sized to receive an end portion of a terminated array 22. Further, each endwall includes two opposed portions 49—49 each of which extends beyond adjacent sidewalls.

Figure 7:
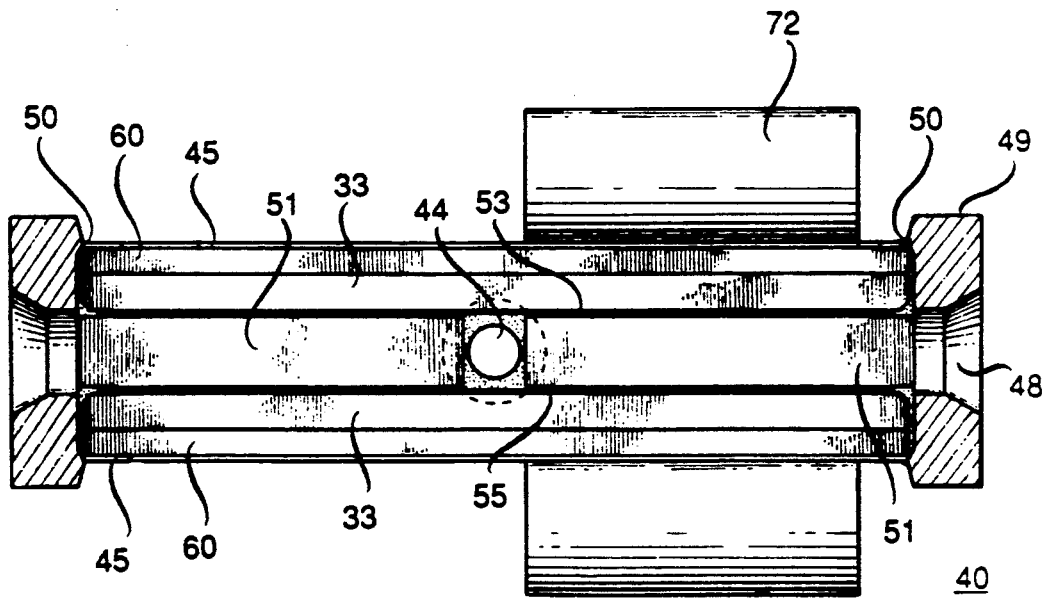
FIG. 7 is a front elevational view partially in section of the housing of FIG. 6 with backing plates, negative chips and a clamping member assembled thereto.

Going now to FIG. 7, it can be seen that each opposed portion 49 of each endwall 46 includes a detent 50. Each detent extends across the width of its associated opposed portion 49 and is capable of being compressed.

Within the coupler body 40, each sidewall 42 is provided with two inwardly facing support ledges 51—51 (see FIGS. 6 and 7). The ledges 51—51, are spaced apart in a longitudinal direction with each being disposed to one side of the access opening 44. The ledges 51—51, two of which on one sidewall are opposed to two on the other sidewall, are adapted to support two negative chips 33—33.

With one negative chip 33 supported on longitudinal edge surfaces 53—53 of the support ledges 51—51 on one side of the coupler body 40 and with another negative chip supported on longitudinal edge surfaces 55—55 on the other side of the coupler body, the negative chips are spaced apart. The distance by which the negative chips are spaced apart is sufficient to allow the introduction of an end portion of a terminated optical fiber array 22 to be inserted therebetween (see FIG. 7) and such that at least portions of the ridges of the negative and positive chips are received in alignment grooves of the positive and negative chips, respectively.

Figure 8:
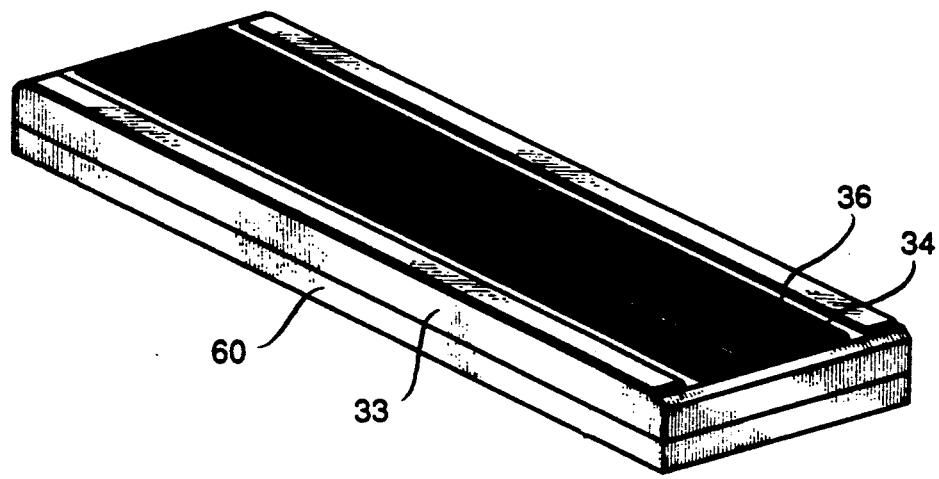
FIG. 8 is a perspective view of a negative chip secured to a backing plate.

Inasmuch as the negative chip 33, as is the positive chip, is made of silicon, provisions are made for protecting the negative chips to prevent damage thereto. This is accomplished by causing backing plates 60—60 (see FIGS. 5 and 7) to become disposed in engagement with the negative chips 33—33. Each backing plate 60 is disposed between an associated one of the negative chips 33—33 and the longitudinal edge surface 45 of the coupler housing 40 (see FIG. 7). Also, as the backing plates are moved inwardly to engage the associated negative chips and to cause the negative chips to become seated in engagement with the support ledges 51—51, end portions of the backing plates are moved past the detents 50—50 and snap-locked thereunder. This secures the backing plates within the housing 40. Further, each backing plate 60 may be adhesively bonded to its associated negative chip 33 to facilitate positioning of the backing plates and the negative chips within the coupler body 40 (see FIG. 8).

After a craftsperson inserts an end portion of a terminated array into one end of the coupler housing 40 and between opposing negative chips, provisions are needed to hold the positive chips in intermeshed engagement with the negative chips. This is accomplished by providing the connector 20 with a clamping system 70 (see FIG. 9). In a preferred embodiment, the clamping system 70 includes two clamping members in the form of spring clips 72—72 the configuration of which is shown best in FIG. 1 and in FIGS. 9-10. As is seen, each clip 72 includes a center portion 74 which is curved slightly inwardly and two leg portions 76—76. Each leg portion 76 includes an inwardly directed portion 78 which terminates in an apex portion 79. From the apex portion 79, the leg continues and includes generally semi-circular portion 81.

Figure 9:
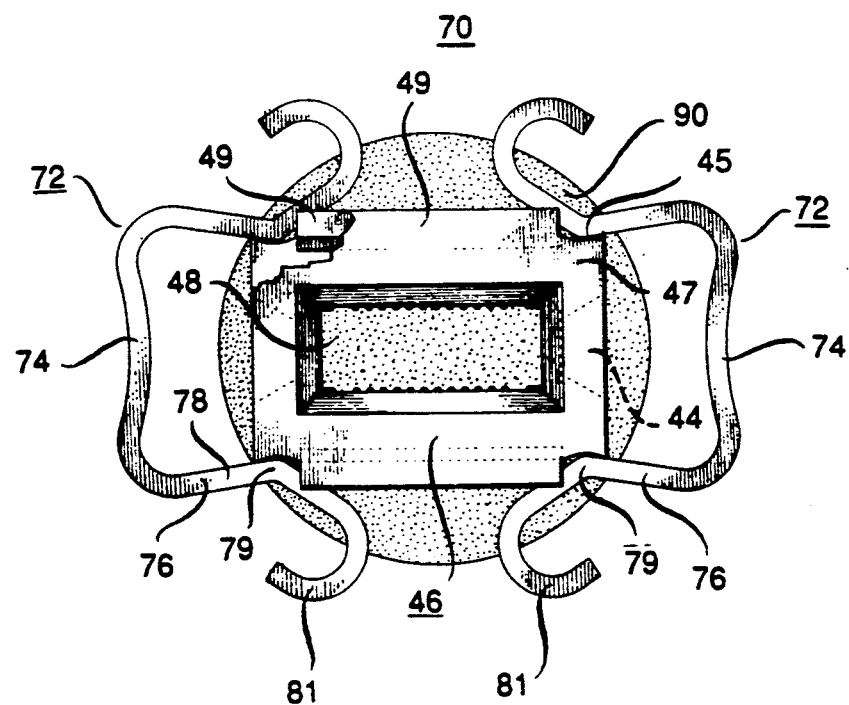
FIG. 9 is an end view of the splicing device of FIG. 1 as it is shipped to a user with a far end cover disposed over an entry of the housing, with a near end cover removed and with clamping members in an armed position.

Viewing now FIG. 9, the connector 20 is shown with the clamping system 70 being in an armed position. Each spring clip 72 is assembled to the coupler housing 40 such that each of the two apex portions 79—79 are disposed in engagement with one of the longitudinal curved edge surfaces 45—45 of the coupler body. In order to become disposed in the aforesaid position, the leg portion 76—76 must be spread apart slightly, whereupon the apex portions become disposed in compressive engagement with the longitudinal curved surfaces 45—45. The arcuate configurations of the surfaces 45—45 are effective to cause the spring clips 72—72 to be retained in the armed position (see FIGS. 7 and 9).

Figure 10:
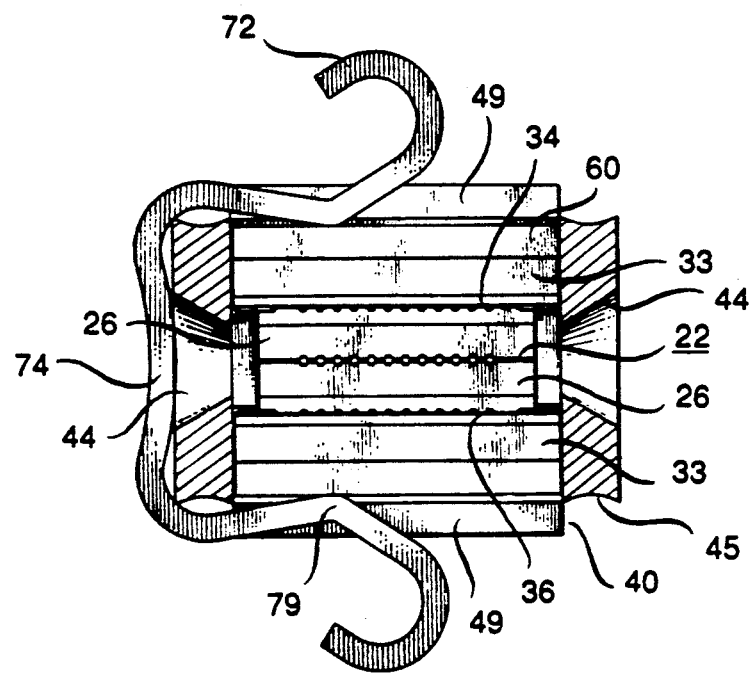
FIG. 10 is an end view of the splicing device of FIG. 1 with clamping members in an active position.

The connector 20 may be shipped to the field with the spring clips 72—72 in the armed position (see FIG. 9). In use, a craftsperson inserts terminated array 22 of a fiber ribbon into an end of the coupler housing 40 and another such array into an opposite end thereof. Then the craftsperson causes each spring clip 72 to be moved from its armed position to its clamping position which is shown in FIG. 10. As is seen in FIG. 10, with the spring clip 72 in a clamping position, the arcuately shaped center portion 74 is in engagement with an outer surface of a sidewall 42 and each apex portion 79 is in engagement with a backing plate 60. Because the leg portions 76—76 are held apart, the leg portions 76—76 cause compressive forces to be applied through the apex portions 79—79 to the backing plates 60—60. As a result, the negative chips 33—33 are caused to become disposed in compressive engagement with the positive chips of the arrays and to be maintained in such engagement to hold the positive chips and hence the optical fibers in alignment in the housing.

Figure 11:
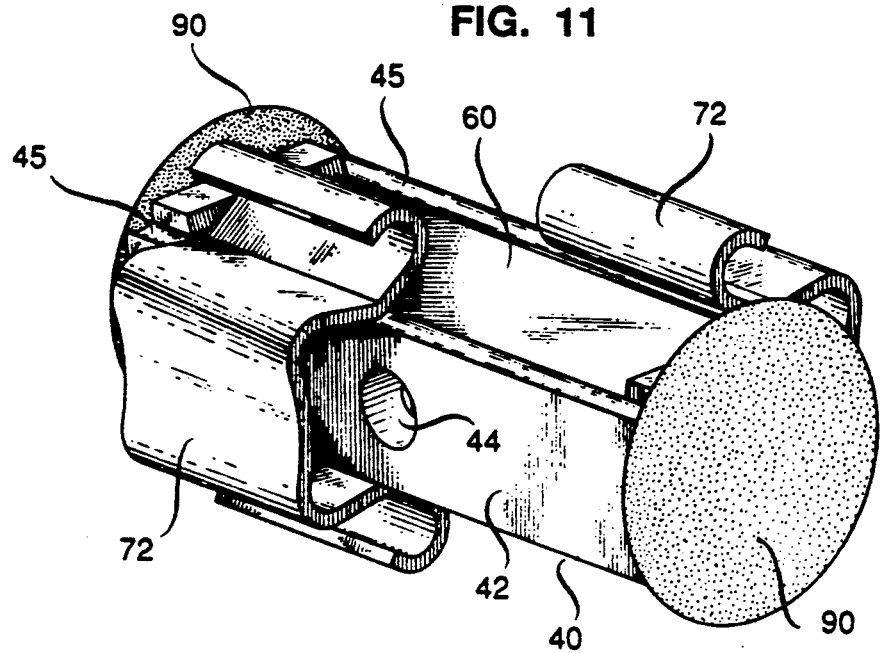
FIG. 11 is a perspective view of the splicing device of this invention as it is shipped to a user in the field.

In FIG. 11 is shown an optical fiber splicing device 20 as it may be shipped from a manufacturer to the field. The device 20 is that as it appears in FIG. 1, of course, without the terminated arrays therein. Contamination of inner portions of the device 20 is prevented by providing covers 90—90, one at each end of the housing 40. Each cover 90 may have an adhesive backing, for example, to cause the cover to become secured to walls which define an open end of the housing. Covers (not shown) also may be provided for the access openings 44—44 in the sidewalls 42—42 of the housing 40 and may be removed temporarily to permit the introduction of an index matching material.

It is to be understood that the above-described arrangements are simply illustrative of the invention. Other arrangements may be devised by those skilled in the art which will embody the principles of the invention and fall within the spirit and scope thereof.

We claim:

1. An optical fiber splicing device for splicing terminated arrays of optical fibers each array including a plurality of optical fiber end portions which are disposed with longitudinal axes of the optical fiber end portions being parallel to one another, said device comprising:

a housing which includes two sidewalls each including inwardly facing support means and two endwalls each endwall having an opening therein for receiving a terminated array of optical fibers to cause end faces of optical fiber end portions of one array which has been inserted into one end of said housing to be adjacent to end faces of optical fiber end portions of another array which has been inserted into the other end of said housing;

alignment means mounted in engagement with said support means to provide a cavity therebetween for receiving a terminated array of fibers from each end of said housing and for causing end faces of the fibers of one of the arrays to be aligned with end faces of the other one of the arrays; and clamping means adapted to be assembled to said housing in an armed, first position out of engagement with said alignment means and capable of being moved to a clamping, second position whereat portions of said clamping means are in compressive engagement with said alignment means to hold the terminated arrays in alignment and in said housing.

2. The optical fiber splicing device of claim 1, wherein each of said sidewalls includes a longitudinal ledge adjacent to one longitudinal edge surface of said sidewall and a longitudinal ledge adjacent to an opposed longitudinal edge surface thereof.

3. The optical fiber splicing device of claim 2, wherein each said longitudinal edge surface of each said sidewall has a concave configuration, said clamping means being a spring clip having opposed bearing portions which are adapted to become disposed in engagement with one of the longitudinal edge surfaces of a sidewall having a concave configuration to hold said spring clips in an armed position.

4. The optical fiber splicing device of claim 1, wherein each of the terminated arrays includes a plurality of optical fiber end portions disposed between two substrates each having a plurality of longitudinally extending parallel grooves on each major surface thereof with each fiber end portion being disposed in a channel formed by opposing grooves of said two substrates and said clamping means includes two alignment substrates each of which includes a plurality of longitudinally extending parallel grooves which mate with ridges which form grooves of the two substrates of the terminated arrays to align the terminated arrays, each of the terminated arrays being adapted to extend through an opening in an endwall so that ends of the terminated arrays are butted together with each alignment substrate adapted to be supported on a ledge of one sidewall and an aligned ledge of the other sidewall.

5. The optical fiber splicing device of claim 4, wherein after the terminated arrays have been inserted into the openings in the endwalls to cause each terminated array to be received between two alignment substrates, a backing plate is caused to become contiguous to each alignment substrate with said spring clips being adapted to be moved from the armed position to a clamping position such that inwardly directed portions of the clips engage a backing plate and cause the backing plate and an associated alignment substrate to be in compressive engagement with the aligned, butted terminated arrays.

6. The optical fiber splicing device of claim 5, wherein each said sidewall includes an opening to provide access to the juncture between the two aligned terminated arrays.

7. The optical fiber splicing device of claim 3, wherein said device also includes two alignment substrates disposed in engagement with said ledges and a backing plate disposed in engagement with and associated with each alignment substrate.

8. The optical fiber splicing device of claim 7, wherein each endwall includes means for holding each backing plate and associated alignment substrate in said housing with said spring clips in an armed position.

9. The optical fiber splicing device of claim 7, wherein each alignment substrate includes a plurality of alternating ridges and grooves on an inwardly facing major surface thereof with each ridge adapted to become mated with a groove of an associated substrate of a terminated array.

10. The optical fiber splicing device of claim 7, which also includes means attached to each endwall for covering said opening into which is destined to be inserted an end portion of a terminated array.

11. The optical fiber splicing device of claim 10, wherein each said sidewall includes an opening to provide access to the juncture between the two aligned terminated arrays and said device also include means for covering each said opening in each said sidewall.

12. An optical fiber splice connection, which comprises:
first and second butted terminated arrays of optical fiber, each of which includes:
two opposing substrates each having a plurality of longitudinally extending, alternating grooves and ridges in each major surface thereof; and
a plurality of optical fibers with an optical fiber end portion being disposed between two aligned, facing grooves of the two substrates; and
an optical fiber splicing device for splicing together said terminated arrays of optical fibers, said splicing device comprising:
a housing which includes two sidewalls and two endwalls, each endwall having an opening therein for receiving a terminated array of optical fibers and each sidewall including inwardly facing support means;
alignment means mounted in engagement with said support means to provide a cavity therebetween in which is received two butted terminated arrays of fibers and for causing end faces of the fibers of one of the arrays to be aligned with end faces of the fibers of the other array; and
clamping means assembled to said housing from an armed, first position out of engagement with said alignment means to a clamping, second position whereat portions of said clamping means are in compressive engagement with said alignment means to hold said terminated arrays in alignment and in said housing.

13. The optical fiber connection of claim 12, wherein each of said sidewalls includes a longitudinal ledge adjacent to one longitudinal edge surface of said sidewall and a longitudinal ledge adjacent to an opposed longitudinal edge surface thereof.

14. The optical fiber splice connection of claim 13, wherein each said longitudinal edge surface of each said sidewall has a concave configuration, said clamping means being a spring clip having opposed bearing portions which prior to having been moved to the clamping position were disposed in engagement with one of the longitudinal edge surfaces of a sidewall having a concave configuration to hold said spring clips in the armed position.

15. The optical fiber splice connection of claim 14, wherein each of the terminated arrays includes a plurality of optical fiber end portions disposed between two substrates each having a plurality of longitudinally extending parallel grooves on each major surface thereof with each fiber end portion being disposed in a channel formed by opposing grooves of said two substrates and said clamping means includes two alignment substrates each of which includes a plurality of longitudinally extending parallel grooves which mate with ridges which form grooves on outwardly facing surfaces of the two substrates of the terminated arrays to align the terminated arrays, each of the terminated arrays extending through an opening in an endwall so that ends of the terminated arrays are butted together with each alignment substrate supported on a ledge of one sidewall and an aligned ledge of the other sidewall.

16. The optical fiber splice connection of claim 15, wherein with the terminated arrays inserted into the openings in the endwalls to cause each terminated array to be received between two alignment substrates, a backing plate is contiguous to each alignment substrate with each of said clips having been moved from the armed position to the clamping position such that inwardly directed portions of the clips engage a backing plate and cause the backing plate and an associated alignment substrate to be in compressive engagement with the aligned, butted terminated arrays.

17. The optical fiber splice connection of claim 16, wherein at least one said sidewall includes an opening to provide access to the juncture between the two aligned terminated arrays.

18. The optical fiber splice connection of claim 16, wherein each sidewall is provided with an access opening through which an index matching material may be introduced into said housing.

19. The optical fiber splice connection of claim 16, wherein each endwall includes means for holding each backing plate and associated alignment substrate in said housing.

* * * * *